(12) United States Patent
Croulard et al.

(10) Patent No.: US 6,834,000 B2
(45) Date of Patent: Dec. 21, 2004

(54) DOUBLE RESONANCE HIGH VOLTAGE CONVERTER WITH START-UP

(75) Inventors: Vincent Croulard, Cergy (FR); George-William Baptiste, Buc (FR); Alain Durville, Arcueil (FR)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 0 days.

(21) Appl. No.: 10/424,603

(22) Filed: Apr. 28, 2003

(65) Prior Publication Data

US 2003/0231514 A1 Dec. 18, 2003

(30) Foreign Application Priority Data

May 27, 2002 (FR) .............................. 02 06443

(51) Int. Cl.[7] .............................................. H02M 3/335
(52) U.S. Cl. ................................................................. 363/16
(58) Field of Search .......................... 363/16, 123, 131; 703/13

(56) References Cited

U.S. PATENT DOCUMENTS 5,677,602 A * 10/1997 Paul et al. ............... 315/224
6,324,080 B1 * 11/2001 Laeuffer .................... 363/25
6,711,533 B1 * 3/2004 Aymard et al. ............ 703/13

FOREIGN PATENT DOCUMENTS

| EP | 0902528 | 3/1999 |
|---|---|---|
| EP | 0902529 | 3/1999 |
| EP | 1030435 | 8/2000 |

* cited by examiner

*Primary Examiner*—Shawn Riley
(74) *Attorney, Agent, or Firm*—Jay L. Chaskin; Cantor Colburn LLP

(57) ABSTRACT

A double resonance voltage converter and method of operating such a converter having: a switching circuit with a first switch and a second switch; a double resonance resonant circuit having a series resonant circuit and a parallel resonant circuit; a rectifying and filtering circuit, and a control circuit for controlling the switching circuit having two state arrangements. A first arrangement controls the conducting states of the switching circuit and a second arrangement controls the start of the first arrangement. The converter may be used to obtain very high voltages, on the order of 100 kilovolts and more, for providing power to an X-ray tube in a radiological imaging apparatus.

24 Claims, 3 Drawing Sheets

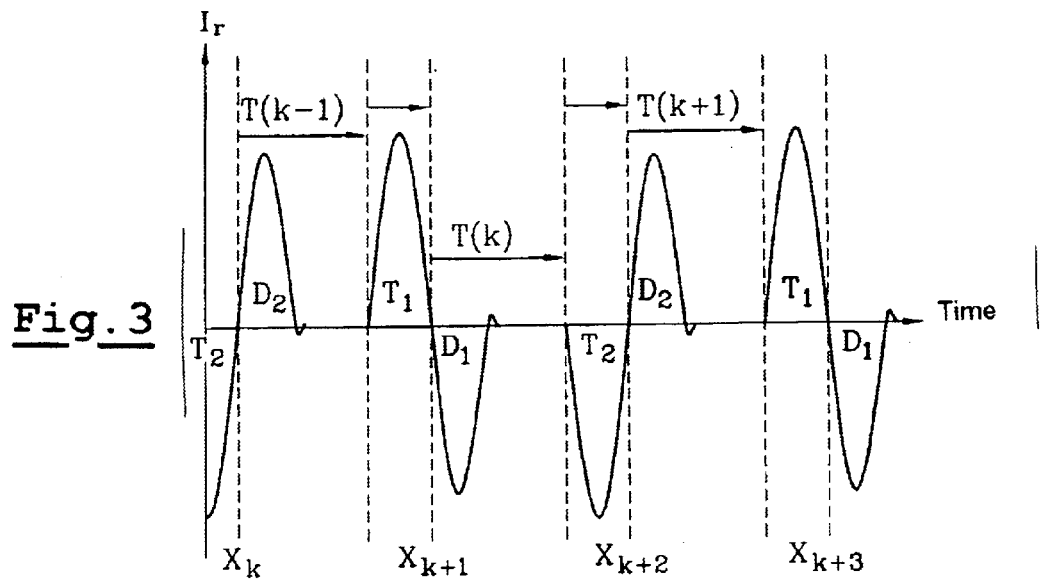
Fig. 3
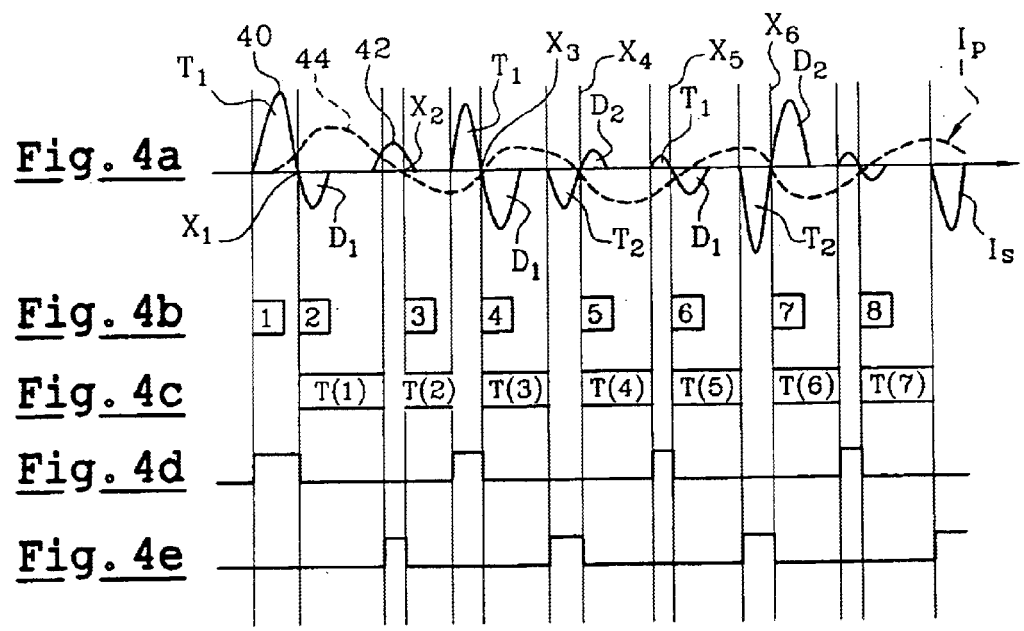
Fig. 4a
Fig. 4b
Fig. 4c
Fig. 4d
Fig. 4e

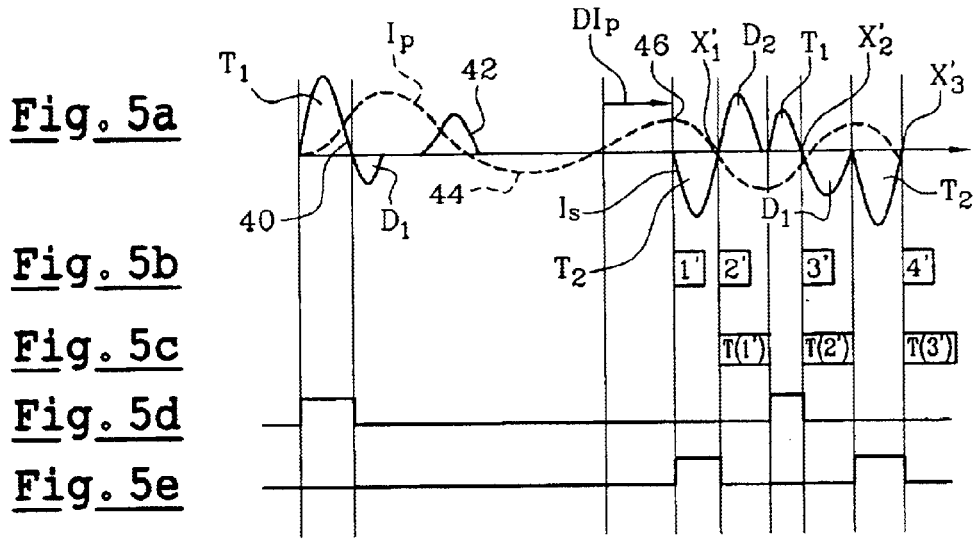
Fig. 5a
Fig. 5b
Fig. 5c
Fig. 5d
Fig. 5e
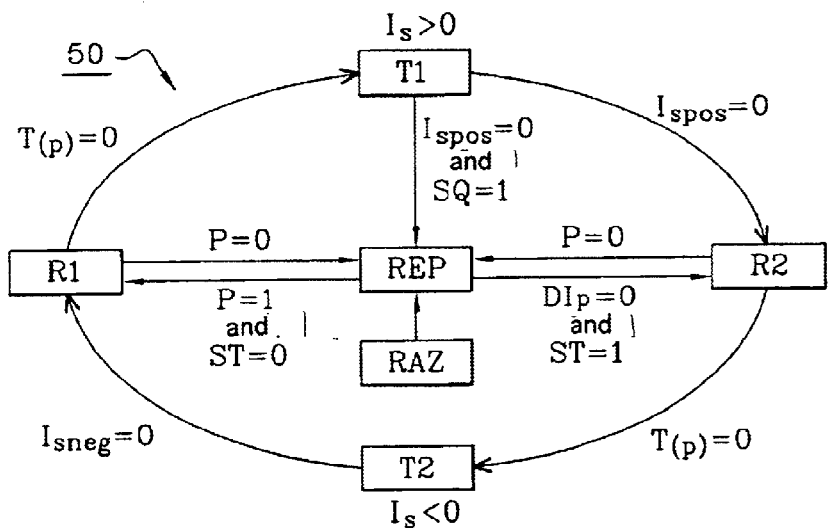
Fig. 6
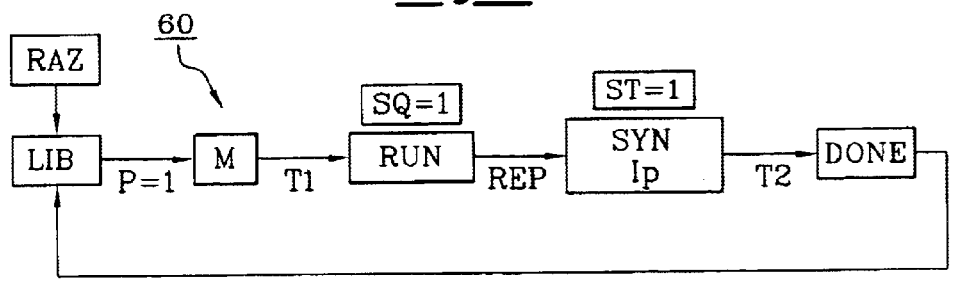
Fig. 7

DOUBLE RESONANCE HIGH VOLTAGE CONVERTER WITH START-UP

CROSS-REFERENCE TO RELATED APPLICATIONS

This application claims the benefit of a priority under 35 USC 119(a)–(d) to French Patent Application No. 02 06443 filed May 27, 2002, the entire contents of which are hereby incorporated by reference.

BACKGROUND OF THE INVENTION

This invention relates to a double resonance electronic converter and a method operating such a converter, which may be used to obtain very high dc voltages, on the order of 100 kilovolts and more, for providing power, e.g., to an X-ray tube in a radiological imaging apparatus.

There exist many types of electronic converters including the type known as the "double resonance". The "double resonance" uses a circuit having two resonance frequencies.

A double resonance electronic converter generally comprises four parts: a switching circuit; a double resonance circuit; a rectifying and filtering circuit; and a control circuit for the switching circuit. The switching circuit comprises two switches whose switching on (conduction) or off (break) are controlled by the control circuit. A dc voltage is applied to the terminals switches so that the potential of the positive pole is applied to the resonance circuit when only one switch is on, while the potential of the negative pole is applied when only the other switch is on.

The resonance circuit comprises: a parallel resonant circuit comprising an inductor and a capacitor; a series resonant circuit comprising inductors, as well as a capacitor; and a transformer.

The rectifying and filtering circuit comprises two rectifier diodes, two filtering capacitors and a load resistor. The output voltage of the converter is taken from the terminals of resistor.

The control circuit controls the conduction and blockage of the switches as a function the following three parameters: the series current in one inductor; the parallel current in another inductor; and the measured output voltage.

The operating characteristics of the resonant circuit provides a curve of the modulus of the frequency response between an input voltage at the common node of the switches, and an output voltage at the terminals of capacitor. This curve shows two resonance frequencies and zero transmission at an intermediate frequency. The conduction of one of the switches establishes a direct current in the resonant circuit that unbalances the series current and deactivates the parallel current.

BRIEF DESCRIPTION OF THE INVENTION

The invention and embodiments thereof is a method and circuit for controlling the switches of a double resonance converter so as to obtain a balanced start up condition.

In an embodiment of the invention the start of the conduction of the switches is synchronized with the value of the parallel current. More particularly, the start of the first conduction of one of the switches is carried out at the maximum positive value of the parallel current.

BRIEF DESCRIPTION OF THE DRAWINGS

The present invention and embodiments thereof will become more apparent from reading the following description together with the appended drawings in which:

FIG. 3 is a diagram illustrating the operation of a known double resonance converter;

FIGS. 4a to 4e are diagrams illustrating the starting up of a double resonance converter according to the prior art, FIGS. 5a to 5e are diagrams illustrating the starting up of a double resonance converter in an embodiment of the invention; and FIGS. 6 and 7 are diagrams illustrating two state circuit arrangements in an embodiment of the invention.

DETAILED DESCRIPTION OF THE INVENTION

Figure 1:
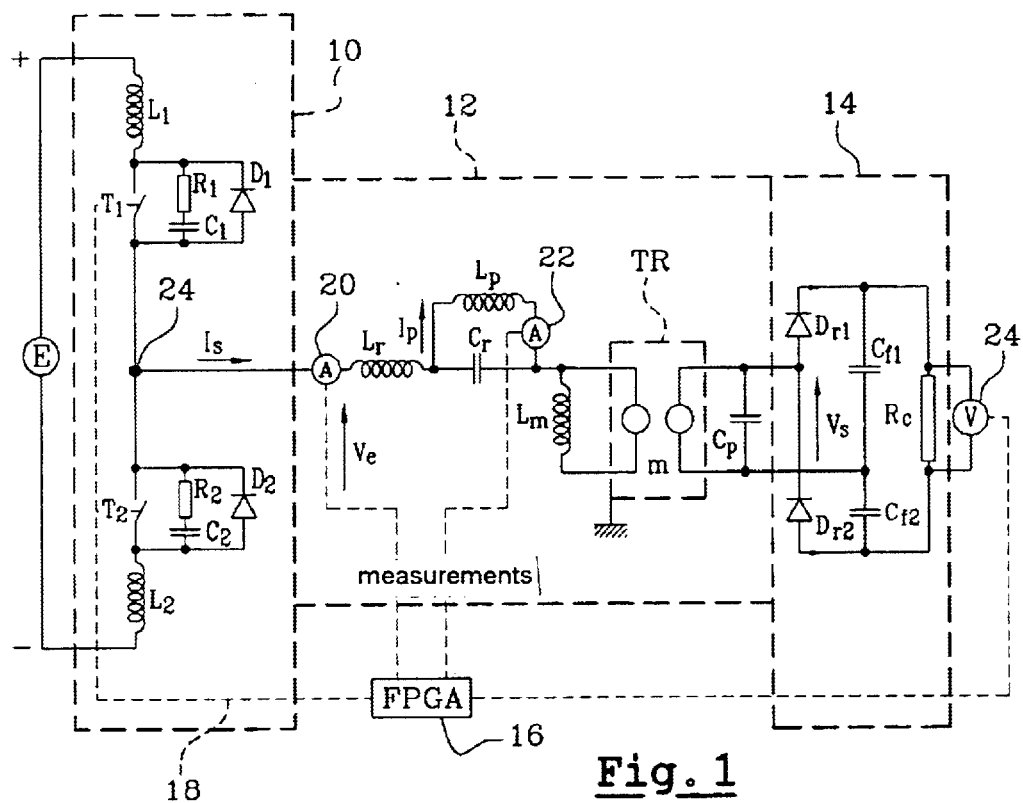
FIG. 1 is a simplified diagram of a known double resonance converter.
Figure 2:
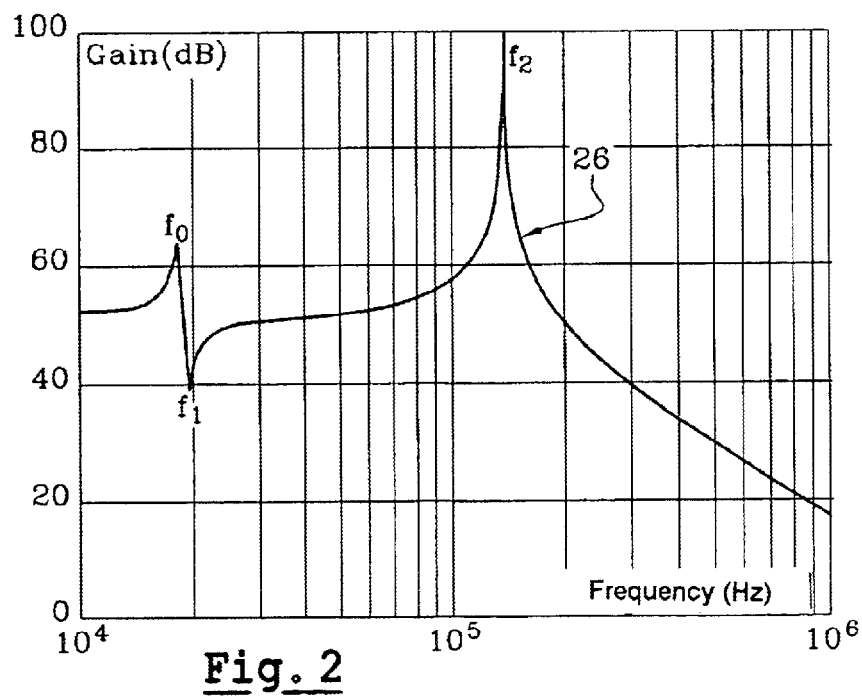
FIG. 2 is a frequency response curve for the output voltage of the converter with respect to its input voltage in a known double resonance converter.

FIG. 1 is a simplified circuit diagram of a known double resonance electronic converter, while FIG. 2 is a curve showing the modulus of the frequency response of the resonant circuit between an input voltage Ve and an output voltage Vs.

As shown in FIG. 1, a double resonance electronic converter comprises four parts: a switching circuit 10; a double resonance circuit 12; a rectifying and filtering circuit 14; and a control circuit 16 for the switching circuit 10.

The switching circuit 10 comprises two switches T1 and T2 whose switching on (conduction) or off (break) are controlled by the control circuit 16, the control being represented by a broken line 18. The two switches T1 and T2 can be formed, e.g. of IGBT (insulated gate bipolar transistor) type transistors, and their switching drive circuitry comprises an inductor L1 (or L2) in series with the transistor/switch, a serial circuit R1C1 (or R2C2) and a diode D1 (or D2) in parallel.

A dc voltage E is applied to the terminals of both switches T1 and T2 so that the potential of the positive pole is applied to the resonance circuit 12 when only switch T1 is on, while the potential of the negative pole is applied when only switch T2 is on.

A known resonance circuit 12 comprises: a parallel resonant circuit comprising an inductor Lp and a capacitor Cp; a series resonant circuit comprising inductors L1, L2, Lr and Lm, as well as a capacitor Cr and a transformer TR having a transformer ratio equal to m.

A known rectifying and filtering circuit 14 comprises: two rectifier diodes Dr1 and Dr2, two filtering capacitors Cf1 and Cf2 and a load resistor Rc.

The output voltage V of the converter is taken from the terminals of resistor Rc.

The control circuit 16 controls the conduction and blockage of switches T1 and T2 as a function the following three parameters: the series current Is in inductor Lr, as measured by a device 20; the parallel current Ip in inductor Lp, as measured by a device 22; the output voltage V measured by a device 24.

The operating characteristics of the resonant circuit 12 provides a curve 26, shown in FIG. 2, of the modulus of the frequency response between an input voltage Ve at the common node 24 of switches T1 and T2, and an output voltage Vs at the terminals of capacitor Cp. This curve 26 shows two resonance frequencies f0 and f2, and zero transmission at an intermediate frequency f1. As an example, the values can be as follows: f0=18.16 KHz, f1=19.37 KHz and f2=138.59 KHz.

The converter in an embodiment of the invention may be used between frequencies f1 and f2, between which the gain varies from 40 to 80 decibels, to enabling varying the voltage and power at the converter output. The operation is shown in FIG. 3, where the series current Is as a function of time, Is being measured by device 20, as follows. The instant when switch T1 or T2 begins to conduct is defined with respect to the instant $X_k$, $X_{k+1}$, $X_{k+2}$ or $X_{k+3}$ of end of conduction of the preceding switch, which corresponds to a passage to zero of the series current Is, along one direction or the other, by counting respectively a period T(k−1), T(k) or T(k+1).

Accordingly, the start of conduction of switch T2 is determined by counting down a duration T(k) that was calculated at the time of the preceding cycle during the conduction time of diode D2, referred to as a freewheeling diode.

This aspect of calculating durations T is shown in the diagrams of FIG. 4. Thus, FIG. 4a shows curves for the series current Is (full lines) and parallel current Ip (broken lines) upon starting a supply sequence. After starting, for example, a radiological (X-ray) image acquisition, and in a stable mode, switch T1, for instance is conducting, a calculation of duration T(4) is carried out during interval (4) and its value is counted down from the instant X4 when the series current Is an switch T2 passes to zero. At the end of the interval T(4), switch T1 is conducting between the instants X4 and X5. T(5) is calculated during interval (5), and its value is counted down from the instant X5 when the series current Is in switch T1 passes to zero, and so on for the values T(6) and T(7).

When starting, for example, the radiological image acquisition, one of switches T1 or T2 is systematically caused to be conducting, for instance T1 In the example of FIG. 4 (curve 40). Also, there is carried out a first calculation of the countdown duration T(1), immediately from the starting instant, during the interval (1). T1 being counted down from the instant X1 when the series current Is in switch T1 passes to zero.

From the start of counting down T(1), T(2) is calculated during the interval (2), which corresponds substantially to the conduction time of diode D1. Duration T(2) is counted down from the instant X2 when the series current Is shown by curve 42 passes to zero. When the countdown of T(2) ends, switch T1 becomes conducting again.

Meanwhile, the countdown duration T(3) is calculated during interval (3), the countdown of T(3) taking place from the instant X3 when the series current Is through switch T1 passes to zero.

FIG. 4d shows the intervals during which switch T1 is conducting while FIG. 4e shows the intervals during which switch T2 is conducting. The diagrams of FIG. 4 show that the start sequence of the converter leads to very asymmetrical series currents is in going from one switch to the other. The conduction of the first switch establishes a direct current in the resonant circuit, which unbalances the series current Is and deactivates the parallel current Ip.

The drawings of FIGS. 5a to 5e are analogous to those of FIGS. 4a to 4e, but correspond to an embodiment of the invention. The embodiment of the invention comprises making, e.g., switch T1 conducting, which yields the curves 40 and 42 for the series current is as well as curve 44 for the parallel current Ip as in FIG. 4a. However, there is no calculation of the duration of times T(1) and T(2) to switch on switches T2 and T1, respectively.

In an embodiment, switch T2 is set to the on state when the parallel current Ip reaches a maximum positive value MAX at peak 46. During the time interval (1'), the time period T(1') is calculated for the count down starting from the point of passage to zero X'1 of the start of switch T1 being conducting. During the time interval (2'), the time period T(2') is calculated for the count down starting from the point of passage to zero X'2 of the start of switch T2 being conducting. During the time interval (3'), the time period T(3') is calculated for the count dawn starting front the point of passage to zero X'3 of the start of switch T1 being conducting (curve not shown).

To obtain the above-described operation, the control circuit 16 comprises two state arrangements 50 and 60 that are shown schematically in FIGS. 6 and 7, respectively.

When off, the two state arrangements 50 and 60 are at the rest state REP for arrangement 50 and LIB for arrangement 60.

Before starting, for example, a radiological image acquisition, the operator carries out a number of settings according to the type of image to be acquired by inputting the corresponding parameters, and then starts the image acquisition by pressing a button. This button triggers the two state arrangements 50 and 60 by a reset to zero signal RAZ that bring them to an initial state. In, for example, a radiological acquisition, there is produced the logic signal P=1 so that arrangement 50 passes to a state R1 of counting down the time period T(p) while arrangement 60 passes to a state M.

When the countdown in completed. T(p)=0, switch T1 is conducting, so bringing arrangement 60 to a RUN state corresponding to logic signal SQ=1.

When the series current is becomes equal to zero, logic signal Ispos=1 while SQ=1, arrangement 50 returns to the rest state REP. The signal of that rest state REP causes arrangement 60 to pass to state SYNIp, referred to as the state of synchronization with the parallel current Ip.

This state SYNIp enables the definition of the instant of the maximum value of the parallel current Ip, for instance by counting down a time period DIp corresponding to one quarter of the time period of current Ip. When DIp=0 and SQ=1, arrangement 50 passes to state R2.

In the general case of a starting sequence; there is no countdown of the time period T(p), i.e. T(p)=0 or that period is fixed, so that switch T2 is conducting. Arrangement 60 then passes to a DONE state, which signifies the end of the starting sequence. Arrangement 60 then passes to the LIB state at the end of the acquisition when the arrangement 50 returns to the rest state REP at the end of the radiological image acquisition, i.e., when the logic signal P=0 appears, that signal P=0 occurring during the countdown states R1 or R2.

An embodiment has been described for a control circuit 16 which first triggers the conducting state of switch T1, then that of switch T2 when the parallel current Ip attains the maximum positive value MAX. However, the embodiment can be implemented with a control circuit that first triggers the conducting state of switch T2 and then that of switch T1 but, in this case, the maximum value that is taken into account is the negative value of the parallel current Ip.

The invention and embodiments thereof is therefore directed to a double resonance electronic converter comprising: a switching circuit comprising a first switch and a second switch; a double resonance resonant circuit comprising a series resonant circuit and a parallel resonant circuit; a rectifying and filtering circuit, and a control circuit for controlling the switching circuit comprising two arrangements: a first arrangement for controlling states of the switching circuit and a second arrangement for controlling the start of the first arrangement.

In an embodiment of the invention, the second arrangement comprises: means for measuring a current Ip in the parallel resonant circuit; and means for triggering first the conduction of the first switch and for triggering thereafter the conduction of the second switch when the parallel current reaches a maximum value.

In an embodiment of the invention the instant of the maximum value of the parallel current is determined by a countdown of the duration of one quarter of the time period of the parallel current starting from the passage to zero of the parallel current.

In an embodiment of the maximum value of the parallel current is of the same polarity as the series current flowing in the series resonant circuit.

One skilled in the art may make or propose various modifications to the function and/or way and/or result of the disclosed embodiments without departing from the scope and extent of protection.

What is claimed is:

1. A method of starting a double resonance voltage converter having a switching circuit comprising a first switch and a second switch; a double resonance resonant circuit comprising a series resonant circuit; a parallel resonant circuit; a rectifying and filtering circuit; and a control circuit for controlling the switching circuit comprising:

providing two arrangements for controlling the states of conduction of the switching circuit;

providing a first arrangement for controlling states of the switching circuit;

providing a second arrangement for controlling the start of the first arrangement, wherein the conduction of one of the two switches is commanded;

measuring the parallel current in the parallel resonant circuit; and the conduction of the other of the two switches is commanded when the parallel current reaches the maximum value of the same polarity as the series current flowing in the series resonant circuit.

2. The method of claim 1 comprising:

measuring a current in the parallel resonant circuit; and triggering first the conduction of first switch and for triggering thereafter the conduction of second switch when the current in parallel resonant circuit reaches a maximum value.

3. The method of claim 2 comprising:

determining the instant of the maximum value of parallel current by a countdown of the duration of one quarter of the time period of the parallel current starting from the passage to zero of the parallel current.

4. The method of claim 2 wherein the maximum value of the parallel current is of the same polarity as the series current flowing in the series resonant circuit.

5. The method of claim 3 wherein the maximum value of the parallel current is of the same polarity as the series current flowing in the series resonant circuit.

6. The method of claim 2 wherein the start of conduction of the second switch is determined by counting down a duration calculated at the time of a preceding cycle during the conduction time of a diode in the switching circuit.

7. The method of claim 3 wherein the start of conduction of the second switch is determined by counting down a duration calculated at the time of a preceding cycle during the conduction time of a diode in the switching circuit.

8. The method of claim 4 wherein the start of conduction of the second switch is determined by counting down a duration calculated at the time of a preceding cycle during the conduction time of a diode in the switching circuit.

9. The method of claim 5 wherein the start of conduction of the second switch is determined by counting down a duration calculated at the time of a preceding cycle during the conduction time of a diode in the switching circuit.

10. A double resonance voltage converter comprising:

a switching circuit comprising a first switch and a second switch;

a double resonance resonant circuit comprising a series resonant circuit and a parallel resonant circuit;

a rectifying and filtering circuit;

a control circuit for controlling the switching circuit comprising two arrangements, a first arrangement for controlling states of the switching circuit and;

a second arrangement for controlling the start of the first arrangement wherein the second arrangement comprises:

means for measuring a current in the parallel resonant circuit; and means for triggering first the conduction of first switch and for triggering thereafter the conduction of second switch when the current in the parallel resonant circuit reaches a maximum value.

11. The converter according to claim 10 wherein the instant of the maximum value of parallel current is determined by a countdown of the duration of one quarter of the time period of the parallel current starting from the passage to zero of the parallel current.

12. The converter according to claim 10 wherein the maximum value of the parallel current is of the same polarity as the series current flowing in the series resonant circuit.

13. The converter according to claim 11 wherein the maximum value of the parallel current is of the same polarity as the series current flowing in the series resonant circuit.

14. The converter of claim 10 wherein the start of conduction of the second switch is determined by counting down a duration calculated at the time of a preceding cycle during the conduction time of a diode in the switching circuit.

15. The method of claim 11 wherein the start of conduction of the second switch is determined by counting down a duration calculated at the time of a preceding cycle during the conduction time of a diode in the switching circuit.

16. The method of claim 12 wherein the start of conduction of the second switch is determined by counting down a duration calculated at the time of a preceding cycle during the conduction time of a diode in the switching circuit.

17. A method of starting a double resonance voltage converter having a switching circuit having a first switch and a second switch; a double resonance resonant circuit comprising a series resonant circuit; a parallel resonant circuit; a rectifying and filtering circuit; and a control circuit for controlling the switching circuit comprising:

providing two arrangements for controlling the states of conduction of the switching circuit, wherein a first arrangement controls the states of the switching circuit and a second arrangement controls the start of the first arrangement wherein a current in the parallel resonant circuit is measured;

triggering first the conduction of first switch; and triggering thereafter the conduction of second switch when the current in the parallel resonant circuit reaches a maximum value.

18. The method of claim 17 comprising:

determining the instant of the maximum value of parallel current by a countdown of the duration of one quarter of the time period of the parallel current starting from the passage to zero of the parallel current.

19. The method of claim 17 wherein the start of conduction of the second switch is determined by counting down a duration calculated at the time of a preceding cycle during the conduction time of a diode in the switching circuit.

20. The method of claim is wherein the maximum value of the parallel current is of the same polarity as the series current flowing in the series resonant circuit.

21. A double resonance voltage converter comprising:

a switching circuit comprising a first switch and a second switch;

a double resonance resonant circuit comprising a series resonant circuit and a parallel resonant circuit;

a rectifying and filtering circuit;

a control circuit for controlling the switching circuit comprising two arrangements, a first arrangement for controlling states of the switching circuit and a second arrangement for controlling the start of the first arrangement means for commanding the conduction of one of the two switches;

means for measuring the parallel current in the parallel resonant circuit; and means for commanding the conduction of the other of the two switches when the parallel current reaches the maximum value of the same polarity as the series current flowing in the series resonant circuit.

22. The converter according to claim 20 wherein the instant of the maximum value of parallel current is determined by a countdown of the duration of one quarter of the time period of the parallel current starting from the passage to zero of the parallel current.

23. The converter according to claim 20 wherein the maximum value of the parallel current is of the same polarity as the series current flowing in the series resonant circuit.

24. The converter of claim 20 wherein the start of conduction of the second switch is determined by counting down a duration calculated at the time of a preceding cycle during the conduction time of a diode in the switching circuit.

* * * * *

UNITED STATES PATENT AND TRADEMARK OFFICE
CERTIFICATE OF CORRECTION

PATENT NO. : 6,834,000 B2
DATED : December 21, 2004
INVENTOR(S) : Vincent Croulard et al.

It is certified that error appears in the above-identified patent and that said Letters Patent is hereby corrected as shown below:

Column 3,
Line 26, after "Is" delete "an" and insert -- in --,
Line 34, after "T1" delete "In" and insert -- in -,
Line 54, after "currents" delete "is" and insert -- Is --, and
Line 62, after "current" delete "is" and insert -- Is --.

Column 4,
Line 8, after "count" delete "dawn" and insert -- down --, and
Line 31, after "current" delete "is" and insert -- Is --.

Column 7,
Line 10, after "claim" delete "is" and insert -- 18 --.

Signed and Sealed this

Twentieth Day of December, 2005

JON W. DUDAS
*Director of the United States Patent and Trademark Office*